United States Patent
Pham

[19]

[11] Patent Number: 6,112,155
[45] Date of Patent: Aug. 29, 2000

[54] MULTIPLE SUPPRESSION IN GEOPHYSICAL DATA

[75] Inventor: Long Don Pham, Houston, Tex.

[73] Assignee: Exxon Production Research Company, Houston, Tex.

[21] Appl. No.: 09/029,689

[22] PCT Filed: Sep. 18, 1996

[86] PCT No.: PCT/US96/14977

§ 371 Date: Nov. 19, 1999

§ 102(e) Date: Nov. 19, 1999

[87] PCT Pub. No.: WO97/11390

PCT Pub. Date: Mar. 27, 1997

Related U.S. Application Data

[63] Continuation of application No. PCT/US96/14977, Sep. 18, 1996.
[60] Provisional application No. 60/003,995, Sep. 19, 1995.

[51] Int. Cl.[7] .................................................. G06F 19/00
[52] U.S. Cl. ................................................................ 702/14
[58] Field of Search ................................. 702/14, 17, 18; 367/73, 24

[56] References Cited

U.S. PATENT DOCUMENTS

| | | | |
|---|---|---|---|
| 4,918,670 | 4/1990 | Wang | 367/38 |
| 5,062,086 | 10/1991 | Harlan et al. | 367/38 |
| 5,394,325 | 2/1995 | Schneider, Jr. | 364/421 |
| 5,532,976 | 7/1996 | Schneider, Jr. | 367/38 |

OTHER PUBLICATIONS

Hole, J. A. and Zelt, B. C, 3–D finite–difference reflection traveltime, Geophysics, J. Int. (1995), vol. 121, pp. 427–434.

*Primary Examiner*—Donald E. McElheny, Jr.
*Attorney, Agent, or Firm*—Frank E. Reid

[57] ABSTRACT

This invention is a method of attenuating multiples in seismic data, particularly three-dimensional seismic data in which seafloor roughness is present. The method relies on an efficient ray-tracing procedure to determine travel-times for each multiple. The characteristics of the seismic data are used to estimate the waveform of the multiple to be attenuated. The travel-time and the estimated waveform are then used to attenuate the multiple from the original data. The method can be employed both for water-bottom multiples and for source and receiver pegleg multiples.

6 Claims, 4 Drawing Sheets

MULTIPLE SUPPRESSION IN GEOPHYSICAL DATA

This application claims benefit of Provisional Application No. 60/003,995 filed Sep. 19, 1995. This application is a 371 of PCT/US96/14977 filed Sep. 18, 1996.

FIELD OF THE INVENTION

This invention relates to the field of seismic data processing. Specifically, but without limitation, this invention relates to the attenuation of water-layer-related multiples in three-dimensional seismic data processing.

BACKGROUND OF THE INVENTION

The search for subsurface hydrocarbon deposits typically involves a sequence of seismic data acquisition, analysis, and interpretation. The data acquisition phase involves use of an energy source to generate signals which propagate into the earth and reflect from various subsurface geologic structures. The reflected signals, referred to as traces, are recorded by a multitude of receivers on or near the surface of the earth, or in an overlying body of water. These signals are relied upon during the analysis phase to develop an image of the subsurface geologic structures.

The analysis phase involves procedures which vary depending on the nature of the geological structure being investigated, and on the characteristics of the dataset itself. However, because the seismic traces will generally include both a signal component and a noise component, one routine aspect of this phase involves procedures directed at eliminating to the maximum extent possible the noise component in the traces. As is well understood to those skilled in the art, the quality of the output of the data processing phase is a function of the success of the noise elimination procedures.

The final phase is the interpretation of the analytic results. Specifically, the interpreter's task is to assess the extent to which subsurface hydrocarbon deposits are present, thereby aiding such decisions as whether additional exploratory drilling is warranted or what an optimum hydrocarbon recovery scenario may be. Again, as is clearly understood in the art, the quality and accuracy of the results of the noise elimination procedures have a significant impact on the accuracy and usefulness of the results of the interpretation phase. It is clear, therefore, that noise elimination is important in the seismic data processing industry.

Two types of noise are commonly present in seismic data: 1) random ambient noise, and 2) coherent linear noise. Coherent linear noise will often be a function of the location from which the data derives. For example, in offshore seismic data acquisition, the noise component of the received seismic traces will, among other sources, often include unwanted energy deriving from signals which are trapped in the water layer and reflect between the seafloor and the water surface. These signals are often referred to as water-layer-related multiples. Multiple attenuation is an important step in marine seismic data processing.

A variety of techniques have been implemented to attenuate water-layer multiples. One well known method of suppressing multiples focuses on the dip difference between the primary signal and the multiples in the common midpoint-stacked dataset. Dip differences in the time-space domain can be separated in the frequency-wavenumber domain based on frequency content. Once the recorded data are transformed to the frequency-wavenumber domain, a dip filter is applied to the data, and the data are inverse transformed back to the time-space domain. However, several limitations exist on this method. First, the Fourier transform can produce unwanted aliasing noise. Second, the dip filter must be appropriately chosen—an overly narrow filter bandwidth will not sufficiently filter out the multiples, whereas an overly wide filter will suppress desired signal frequencies. Finally, smearing of the desired signal frequencies can result from the transform/inverse transform procedures.

A second method of multiple suppression is referred to as predictive deconvolution. Predictive deconvolution relies on the time series periodicity of the multiples for discrimination of primary signal content from the multiples. Generally, the method involves use of an autocorrelation of the trace data to determine the periodicity of the multiples. Use of that periodicity in the deconvolution operator then allows generation of a signal containing only the desired primary signal. The principle limitation of this method is that multiple periodicity is only maintained for vertical incidence, zero-offset data, and therefore for other types of data, such as common-shot or common-midpoint data, the method is generally unsatisfactory.

An advanced form of predictive deconvolution is referred to as slant-stack multiple suppression. This method was developed to address the vertical incidence, zero-offset limitation of the basic predictive deconvolution procedure. The technique involves the same analytic approach as the basic procedure, except that the deconvolution is performed along radial traces which have constant angles of propagation. Those propagation angles lead to constant time separations between multiples along the radial traces, thereby allowing the deconvolution operator to focus on the periodicity along those traces. Although this procedure improves on the basic technique, its' accuracy is constrained by the extent to which the deconvolution operator length and prediction lag can be determined from the autocorrelation.

A fourth method of multiple suppression focuses on velocity discrimination in either the frequency-wavenumber domain or the time-space domain. These techniques rely on sufficient velocity differences existing between the primary and the multiples. For example, the frequency-wavenumber domain approach involves normal moveout correcting the data using a velocity between the primary and the multiple velocity. Thereafter, the sequence of transforming, filtering, and inverse transforming discussed above in conjunction with dip difference multiple suppression is carried out. Although an improvement upon the dip difference technique, this approach suffers that technique's limitations, specifically with respect to aliasing, filter selection, and data loss due to smearing.

Velocity discrimination in the time-space domain requires generation of a model trace for the multiples, which is then subtracted from individual traces of the normal moveout corrected gather. The result should only contain primary energy. The principle limitation is in generating an accurate model trace, i.e. one which does not contain some primary energy. Typically, the low frequency end of the primary spectrum will have velocities not significantly different than the multiples, and therefore the procedure can lead to loss of the low-frequency energy content of the primary.

In addition to the above limitations of prior art multiple suppression techniques, additional limitations exist which have not been adequately addressed by industry. First, all of the above techniques assume a relatively smooth seafloor. Because propagation and attenuation of multiples varies as seafloor irregularity becomes moderate or severe, a technique which takes into account that irregularity is needed by industry. Second, water bottom multiples also have characteristics which are dependent on water depth, such as phase velocity, due to their dispersive nature. Thus, techniques which accurately take into account water depth-dependent characteristics is required. Third, due to the inadequacies of presently available multiple attenuation methods, some analysts discard small offset traces, sometimes referred to as the near traces, because present multiple attenuation methods are particularly inadequate for those traces. As will be understood to those skilled in the art, however, those traces contain valuable seismic information and are therefore preferably retained for detailed seismic processing. A method which does not breakdown for small offset traces is desired by industry.

Finally, all of the above techniques are only applicable to two-dimensional analysis. In regions characterized by a moderate to highly irregular seafloor, three-dimensional analysis is required. Undulating seafloor surfaces create out-of-plane multiples that are three-dimensional and which cannot be resolved using existing technology. The more rigorous wave-equation-based methods which have been proposed to address those limitations are expensive, particularly in 3-D, and not yet proven to be effective.

Therefore, there is a need for an improved multiple suppression technique which takes into account irregular seafloor surfaces, which can be applied in three-dimensional analysis, and which can be cost effectively implemented. The present invention satisfies this need.

SUMMARY OF THE INVENTION

This invention is a method of attenuating water-layer related multiples in seismic data, particularly three-dimensional seismic data in which seafloor roughness is present. The method relies on an efficient ray-tracing procedure to determine traveltimes for each multiple. The characteristics of the seismic data are used to estimate the waveform of the multiple to be attenuated. The traveltime and the estimated waveform are then used to attenuate the multiple from the original data.

For a given source and receiver location, representing one seismic trace, the method can be implemented in a system of nonlinear equations. The system of equations can be solved using well-known techniques and an assumed or measured function characterizing seafloor roughness to determine the necessary traveltimes. The seismic data is then used to compute an estimate of the waveform of the multiple. This estimate is created, in a preferred embodiment, using a least squares minimization procedure. Finally, the computed traveltime and waveform estimate are combined to attenuate the multiple from the seismic data.

Both the determination of the traveltimes and the least squares minimization can employ well-known techniques which can be efficiently implemented on a digital computer, including personal computers and work-stations. The method can be employed for attenuation of any order multiple of interest in a seismic dataset. In a preferred embodiment, lower order multiples, after having been estimated, are used to estimate the higher order multiples, thus reducing computation time. The method can be employed both for water-bottom multiples, and for source and receiver pegleg multiples.

BRIEF DESCRIPTION OF THE DRAWINGS

The present invention and its advantages will be more easily understood by reference to the following detailed description and the attached drawings in which.

While the invention will be described in connection with its preferred embodiments, it will be understood that the invention is not limited thereto. On the contrary, it is intended to cover all alternatives, modifications, and equivalents that may be included within the spirit and scope of the invention.

DETAILED DESCRIPTION OF THE INVENTION

The present method follows a three step procedure to attenuate water layer-related multiples in seismic data. First, an efficient analytic ray tracing procedure is used to determine traveltimes for each multiple. Next, an estimate of the waveform of the multiple is made using a lower order waveform. Finally, the estimate of the multiple is subtracted at the predicted time to derive a multiple-attenuated seismic waveform.

The steps of the present method involve either simplified or more accurate calculations than have previously been involved in multiple attenuation procedures. The raytracing procedures involved in the first step may rely on a conjugate gradient-based method to determine raypaths satisfying Fermat's principle. This method is computationally efficient, and a cost-effective use of computer resources. The raytracing procedure also allows seafloor variability to be incorporated in the multiple attenuation procedure, a capability not included in prior art methods.

In a preferred embodiment of the present method, the estimate of the waveform is computed using well known least squares minimization procedures, also simplifying the computational task. The least squares implementation allows variability in the amplitude of the multiple as well as the time-shift of the multiple due to the uncertainty in the seafloor to be taken into account.

Figure 1A:
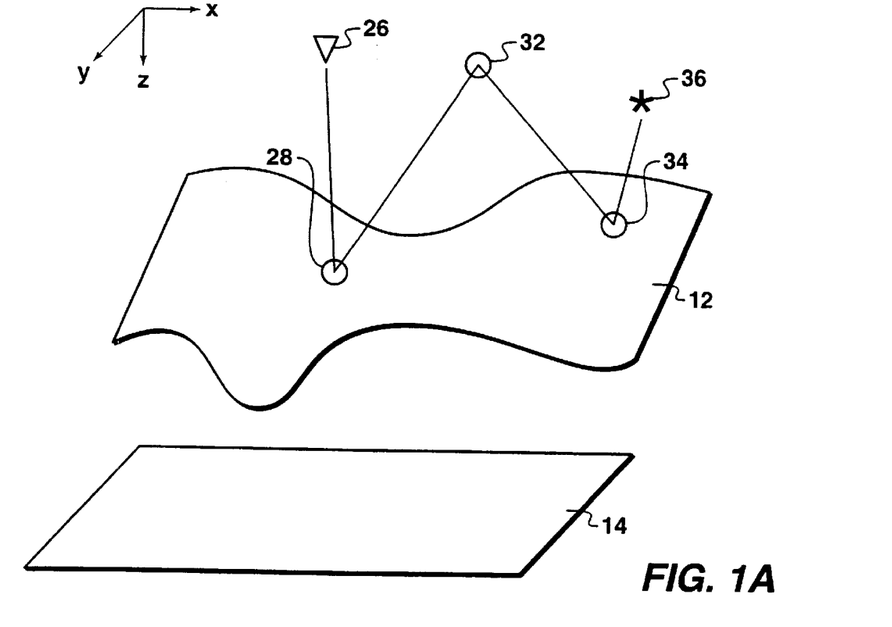
FIGS. 1A and 1B depict examples of first-order and second-order water-bottom multiples, respectively.
Figure 1B:
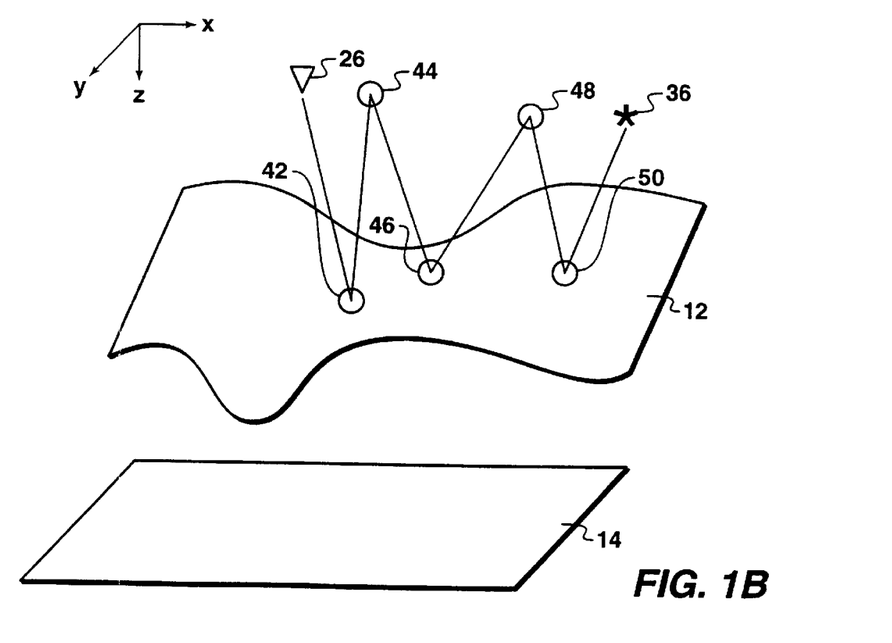
Figure 2:
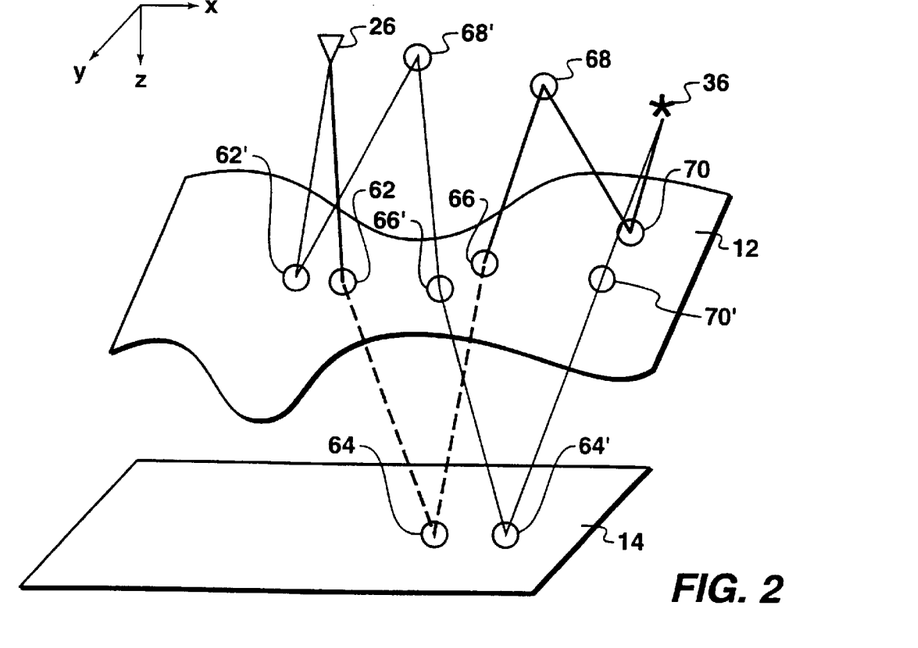
FIG. 2 depicts first-order source and receiver pegleg multiples.

FIGS. 1 and 2 depict typical raypaths for water layer-related multiples which are preferably removed from seismic data prior to final data processing. In each figure, the surface of the water column, or the air-water interface, lies at z=0, using the coordinate reference system depicted. The velocity of sound in the water layer is assumed constant, and will be represented in the following as $V_w$. The seafloor 12 is depicted as a three-dimensional surface whose depth z is characterized generally by the equation $z_i=f(x_i,y_i)$. A sub-seafloor reflector of interest to the data analyst is depicted as planar reflector 14. In these figures the seismic source is depicted as 36, and the seismic receiver as 26.

FIGS. 1A and 1B depict examples of first-order and second-order water-bottom multiples. Water-bottom multiples are contained entirely within the water column. The first order water-bottom multiple reflects once from the surface of the water column (32), and twice from the seafloor (28 and 34), as shown in FIG. 1A. The second order water-bottom multiple reflects twice from the surface of the water column (44 and 48), and three times from the seafloor (42, 46, and 50), as shown in FIG. 1B. As will be clear, an Nth order water bottom multiple will have 2N+2 raypath sublengths, i.e. the first order water bottom multiple in FIG. 1A has four sublengths, as follows: $R_1$ extends from receiver 26 to reflection 28; $R_2$ extends from reflection 28 to reflection 32; $R_3$ extends from reflection 32 to reflection 34; and $R_4$ extends from reflection 34 to source 36. Because of the constant velocity assumption, water bottom multiples have straight raypaths.

FIG. 2 depicts pegleg multiples, which differ from water bottom multiples in that a portion of the pegleg raypath is not entirely contained within the water column. Each pegleg multiple depicted has one reflection from reflector 14, and one reflection from the water surface. The source pegleg multiple has a raypath in FIG. 2 which extends from source 36, through reflection locations 70, 68, 66, 64, 62, to receiver 26. The term source pegleg multiple is used since surface reflection 68 occurs prior to the raypath's refraction through location 66 on the seafloor and the subsequent reflection from planar reflector 14. The receiver pegleg multiple is reversed, i.e. the surface reflection 68' occurs after refraction 66' and the subsequent reflection 64' from reflector 14. As will be clear, an Nth order pegleg multiple will have 2N+4 raypath sublengths, i.e. the first order pegleg multiples in FIG. 2 have six sublengths. As will also be understood, pegleg multiple raypaths bend according to Snell's law at the seafloor 12.

Figure 3A:
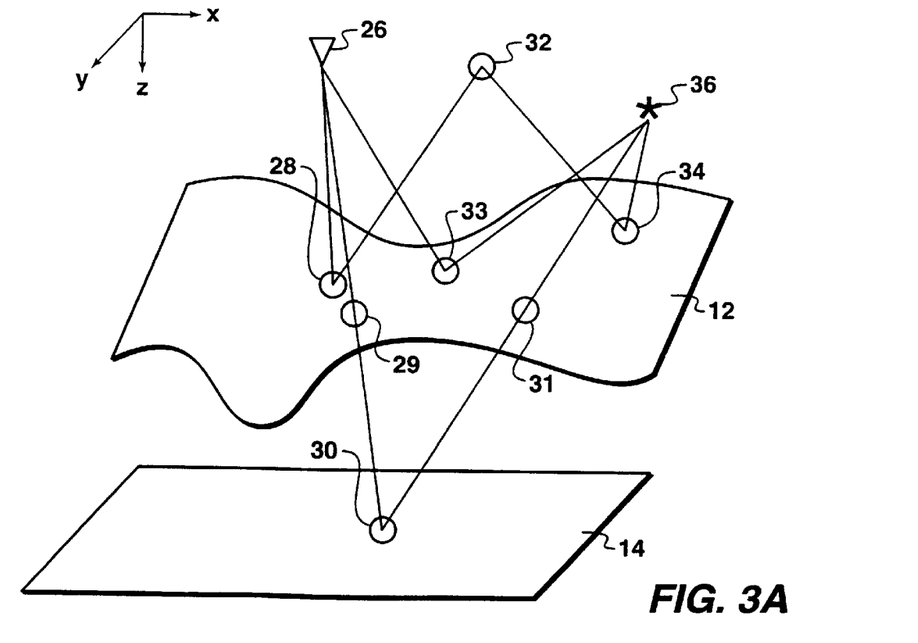
FIG. 3A depicts a simplified example of three raypaths contributing to a composite signal which may be recorded by an analyst attempting to image a sub-seafloor reflector.
Figure 3B:
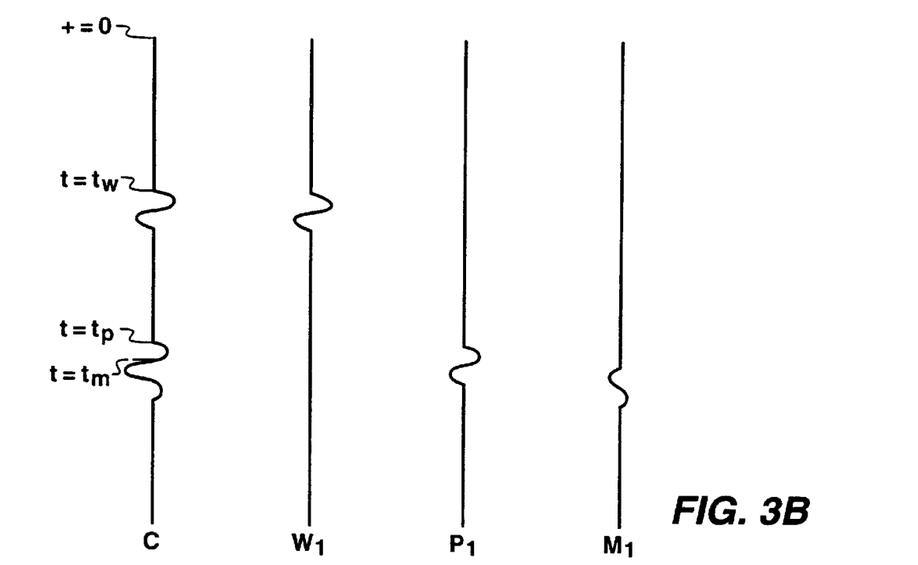
FIG. 3B depicts the composite and the component signals corresponding to the simplified example of FIG. 3A.

The need to remove multiples from seismic data is easily demonstrated by reference to FIG. 3. In FIG. 3A, the raypath from source 36, which reflects at reflection location 30 and thereafter is received by receiver 26, depicts, for example, a raypath which may be of interest to the seismic data analyst processor in determining the characteristics of reflector 14. This raypath will bend according to Snell's law at seafloor locations 31 and 29. However, the signal recorded by receiver 26 will include, for the purposes of this simplified example, three components: 1) the raypath of interest, which corresponds to reflection 30; 2) a raypath resulting from the single reflection from the seafloor at location 33; and 3) the first order water layer multiple involving reflections at 34, 32, and 28. Higher order water layer multiples and pegleg multiples are neglected for the purposes of this example.

FIG. 3B graphically depicts the need for removal of multiples in the recorded seismic trace at receiver 26. As will be understood to those skilled in the art, this figure depicts graphical representations of four seismic traces. The composite signal recorded by receiver 26 in FIG. 3A is depicted as trace C. This signal contains signal content from all three above-described signals, each of which are separately depicted in FIG. 3B, as follows: At time t=0, the source is activated. Some time thereafter, at time $t=t_w$, the receiver will record the signal related to the water bottom reflection 33. This signal is separately shown as $W_1$. Thereafter, at time $t=t_p$, the receiver will record the signal component of the reflection of interest at 30 on planar reflector 14. That signal is separately shown as $P_1$. Finally, at time $t=t_m$, the receiver will record the signal component corresponding to the first order water layer multiple. That signal is separately shown as $M_1$. As will be understood to those skilled in the art, the recorded signal C is a superposition of all three components—the separate traces cannot be individually recorded. The challenge to the analyst is to remove the component corresponding to $M_1$, thereby allowing the analyst to further process the primary signal $P_1$. It will also be understood that the water bottom reflection $W_1$ is not generally removed, as the water bottom is a feature analysts typically prefer to retain as a reference. As will also be understood, the relative times depicted in FIG. 3B are demonstrative only; the relationship of $t_w$, $t_p$, and $t_m$ will vary depending on the location from which the data is obtained.

It is apparent that the problem with recorded signal C is that the component corresponding to $P_1$ has been corrupted by the water layer multiple $M_1$. Multiple attenuation is required if component $P_1$ is to be accurately processed by the analyst. The present method attenuates the multiple by relying on known or measurable information about reflection $W_1$ to determine $M_1$, as is described in the following.

The first step of the present method is to determine traveltime $t_w$ for trace $W_1$. Assuming that the constant speed of sound in the water column is represented as $V_w$, the traveltime of the water bottom reflection $W_1$ may be represented as:

$$t_w = (R_{1w} + R_{2w})/V_w$$

where $R_{1w}$, the raypath sublength from reflection location 33 to the receiver 26, is given by $$R_{1w} = \{(x_1-x_r)^2 + (y_1-y_r)^2 + f^2(x_1,y_1)\}^{1/2}$$

and $R_{2w}$, the raypath sublength from source 36 to reflection location 33, is given by $$R_{2w} = \{(x_s-x_1)^2 + (y_s-y_1)^2 + f^2(x_1,y_1)\}^{1/2}$$

The equations for $R_{1w}$ and $R_{2w}$ represent the length of the respective raypath sublengths, using standard three dimensional distance calculations. Reflection location 33 is represented by the point $(x_1, y_1, z_1)$, where $z_1 = f(x_1, y_1)$ as stated above.

From these equations, it is apparent that the equation for traveltime, $t_w$, has two unknowns—$x_1$ and $y_1$—in addition to $t_w$. As will be understood to those skilled in the art, raypaths must satisfy Fermat's principle, which means that the traveltime equation must satisfy the following relationships:

$$\frac{\partial t_w}{\partial x_1} = \frac{\partial R_{1w}}{\partial x_1} + \frac{\partial R_{2w}}{\partial x_1} = 0$$

$$\frac{\partial t_w}{\partial y_1} = \frac{\partial R_{1w}}{\partial y_1} + \frac{\partial R_{2w}}{\partial y_1} = 0$$

Solving this system of equations is equivalent to finding the minimum of a function of two independent variables. A number of numerical techniques may be used to solve this system of nonlinear equations. Newton's method in multidimensions is one suitable approach, though that method requires a matrix inversion and is therefore not computationally efficient. In a preferred embodiment of the present method, a conjugate gradient technique is used. Conjugate gradient techniques are well known in the art, see for example, E. Polak, *Computational Methods in Optimization*, Academic Press, New York, 1971. An initial estimate of the solution, for use in the conjugate gradient technique, can be made using the traveltime for a flat water bottom assumption. This is equivalent to assuming that the initial location $(x_1, y_1, z_1)$, when projected vertically to the water surface, i.e. z=0. lies midway along a line extending on the water surface from source 36 to receiver 26. From that initial estimate, the technique efficiently solves the system of equations for $(x_1,y_1)$ and thereby determines traveltime, $t_w$.

The only limitation of the Fermat's principle assumption relates to the seafloor function $f(x,y)$. If $f(x,y)$ is highly variable, i.e. it is considered to have extremely rugose features, then the solutions of the equations may be multivalued, with each solution corresponding to a different branch or piece of a multivalued wavefront. It will be apparent to those skilled in the art when any such multivalued solution corresponds to a physically or logically unreasonable traveltime.

Next, a similar set of nonlinear equations, in six variables, must be solved to determine the traveltime of first order water bottom multiple $M_1$. The traveltime for the entire raypath extending from source 36, through reflections 34, 32, and 28. to receiver 26 is given by $$t_m = \sum_{i=1}^{4} R_{im}/V_w$$

The corresponding raypath sublengths are $$R_{1m} = \{(x_1-x_r)^2 + (y_1-y_r)^2 + f^2(x_1,y_1)\}^{1/2}$$

$$R_{2m} = \{(x_2-x_1)^2 + (y_2-y_1)^2 + f^2(x_1,y_1)\}^{1/2}$$

$$R_{3m} = \{(x_3-x_2)^2 + (y_3-y_2)^2 + f^2(x_3,y_3)\}^{1/2}$$

$$R_{4m} = \{(x_s-x_3)^2 + (y_s-y_3)^2 + f^2(x_3,y_3)\}^{1/2}$$

and the relationships which must be satisfied by Fermat's principle are $$\frac{\partial t_m}{\partial x_1} = \frac{\partial R_{1m}}{\partial x_1} + \frac{\partial R_{2m}}{\partial x_1} = 0 \quad \frac{\partial t_m}{\partial y_1} = \frac{\partial R_{1m}}{\partial y_1} + \frac{\partial R_{2m}}{\partial y_1} = 0$$

$$\frac{\partial t_m}{\partial x_2} = \frac{\partial R_{2m}}{\partial x_2} + \frac{\partial R_{3m}}{\partial x_2} = 0 \quad \frac{\partial t_m}{\partial y_2} = \frac{\partial R_{2m}}{\partial y_2} + \frac{\partial R_{3m}}{\partial y_2} = 0$$

$$\frac{\partial t_m}{\partial x_3} = \frac{\partial R_{3m}}{\partial x_3} + \frac{\partial R_{4m}}{\partial x_3} = 0 \quad \frac{\partial t_m}{\partial y_3} = \frac{\partial R_{3m}}{\partial y_3} + \frac{\partial R_{4m}}{\partial y_3} = 0$$

In these equations, the (x,y) locations of reflections 28, 32, and 34 are given by $(x_1,y_1)$, $(x_2,y_2)$ and $(x_3,y_3)$, respectively, with the depth coordinate z defined as a function of (x,y), as described above. Note that in these equations $(x_1,y_1)$ will not be identical to the location of $(x_1,y_1)$ in the equations discussed above for trace $W_1$. This will be understood to those skilled in the art. The form $(x_1,y_1)$ has been used for simplicity in presentation of the equations, not to indicate an identity of $(x_1,y_1)$ with that in the $W_1$ equations.

As above, an initial estimate of the solution of these equations may be made by assuming that the coordinates are multiples corresponding to flat seafloor reflections. For example, for the first order multiple $M_1$, the distance between the source and the receiver may be divided into four equal segments, with initial coordinates assigned accordingly. The conjugate gradient method is used to determine the coordinates of reflections 28, 32, and 34, which can then be used to determine traveltime $t_m$.

Figure 5:
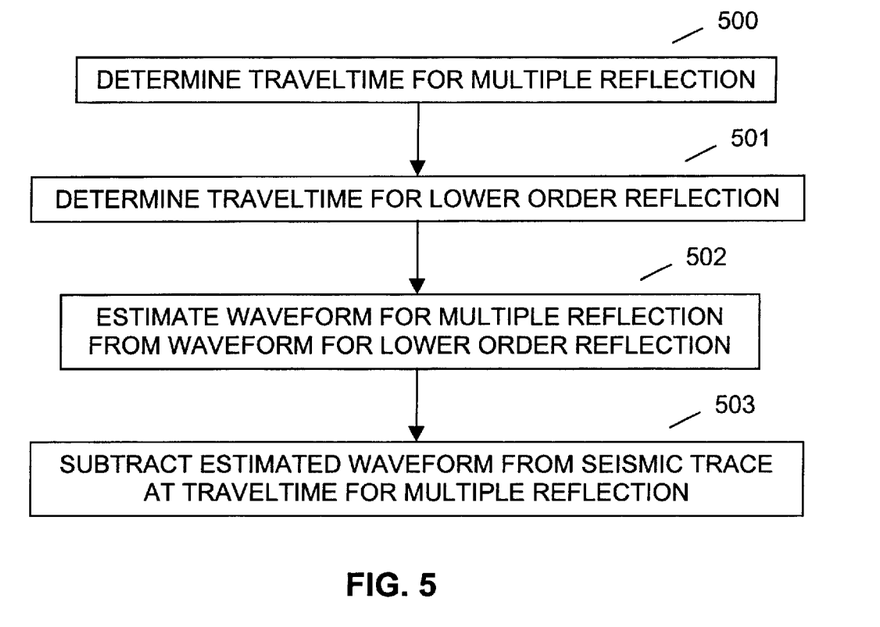
FIG. 5 depicts a flowchart illustrating the processing steps of an embodiment of the method of the invention for attenuating a multiple reflection in seismic data.

Traveltimes $t_w$ and $t_m$ for the water bottom reflection and the first order water layer multiple have now been determined. This is shown in steps 500 and 501, respectively, of FIG. 5. As will be understood to those skilled in the art, the water bottom reflection $W_1$ can now be completely determined, since the waveform $W_1$ may be uniquely determined from the composite trace C. However, $M_1$ cannot be uniquely determined from trace C, as is apparent in FIG. 3B. Therefore, in the next step of the method, the characteristics of $W_1$, which can be determined from composite trace C, are used to estimate the waveform of $M_1$. This is shown in step 502 of FIG. 5. That estimate is then subtracted from composite C, thereby allowing $P_1$ to be uniquely determined. This is shown in step 503 in FIG. 5

Figure 6:
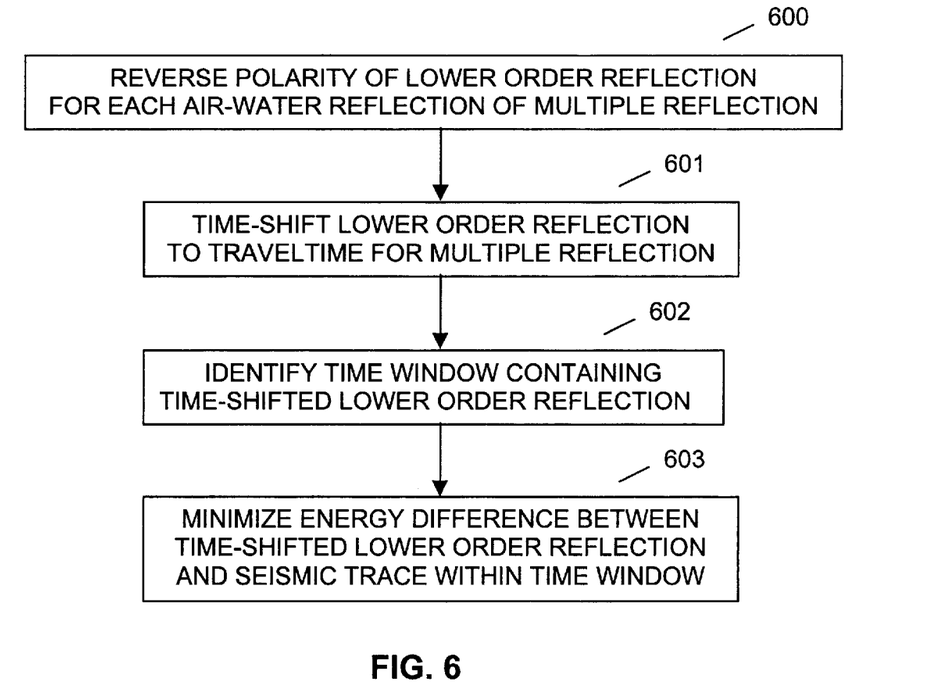
FIG. 6 depicts a flowchart illustrating the processing steps of an embodiment of the method of the invention for estimating the waveform of a multiple reflection from the waveform of a lower order reflection.

FIG. 6 depicts a flowchart illustrating the processing steps of an embodiment of the method of the invention for estimating the waveform of a multiple reflection from the waveform of a lower order reflection, illustrated by the present first order example. The estimate of $M_1$ is determined as follows. Because $M_1$ reflects once from the water surface (z=0), it will have a reversed polarity compared to $W_1$, as is indicated in FIG. 3B. Therefore, $W_1$ is multiplied by the reflection coefficient −1.0, which, except for the polarity reversal, assumes that the water surface is a perfect reflector. This is shown in step 600 of FIG. 6. Next, using the known difference between traveltimes $t_w$ and $t_m$, $W_1$ is shifted in time by the amount $(t_w-t_m)$. This is shown in step 601 of FIG. 6. This shift results in an estimate of the waveform of $M_1$, referred to hereafter as $M_1'$, except that the amplitude difference between $W_1$ and $M_1$ has not been taken into account. As will be apparent from FIG. 3A, the amplitudes of $W_1$ and $M_1$ will be different since $W_1$ has one reflection from seafloor 12, and $M_1$ has two reflections from seafloor 12. As will be understood, seafloor 12 will not reverse polarity of the signal, and is not a perfect reflector.

Therefore, to generate the final estimate of $M_1$, the present method minimizes the energy difference E between the composite signal C and the time-shifted estimate $M_1'$ in a time window focused on time $t_m$. This is shown in steps 602 and 603 of FIG. 6. The variables in that minimization are an amplitude scaling factor a and a time shift t. The amplitude scaling factor takes into account the amplitude differences resulting from the reflections; the time shift takes into account the uncertainty in the time at which $M_1$ occurs in the composite. That uncertainty derives, among other factors, from the digitization of the water-bottom surface. As will be understood, using these two parameters neglects angle-dependent reflectivity. Mathematically, the least-squared minimization equations are:

$$E(\alpha, \tau) = \sum_i \{C_i - \alpha M_i(\tau)\}^2$$

$$\frac{\partial E}{\partial \tau} = \sum_i \{C_i - \alpha M_i(\tau)\} M_i = 0$$

$$\frac{\partial E}{\partial \tau} = \sum_i \{C_i - \alpha M_i(\tau)\} \frac{\partial M_i}{\partial \tau} = 0$$

where i is the index representing the number of samples in the digital time window. The minimization equations can be solved for a and t in a straightforward manner.

Finally, the subtraction of the estimated multiples from the original is performed within a window which will typically be 160 ms in length, which is long enough to contain the multiple waveform. That window length is not a limitation, however.

In this example, the 1 st order water bottom multiple was estimated from the water bottom direct reflection waveform, which can be considered the 0th order water bottom multiple. In other words, the present method can be considered to use the waveforms of the (N−1)th order water-bottom multiple to estimate and attenuate the Nth order water-bottom multiple. The method can therefore be applied to any higher order multiple for which multiple attenuation is desired. For example, the first order water bottom multiple, estimated as described above, may be used to estimate the second order water bottom multiple which is depicted in FIG. 1B. Also, the solutions for the multiples of a given trace can be used as initial guesses for its neighbor traces in the seismic dataset. This facilitates rapid convergence of the solution routine because the traveltimes of the multiples will not generally be expected to vary significantly from trace to trace. Of course, for higher order water-bottom multiples, the size of the system of equations gets larger, although the general structure of the equations is the same.

After the present method is used to remove all water-bottom multiples, the method can be used to perform an analogous procedure to attenuate pegleg multiples, as further described below.

Figure 4:
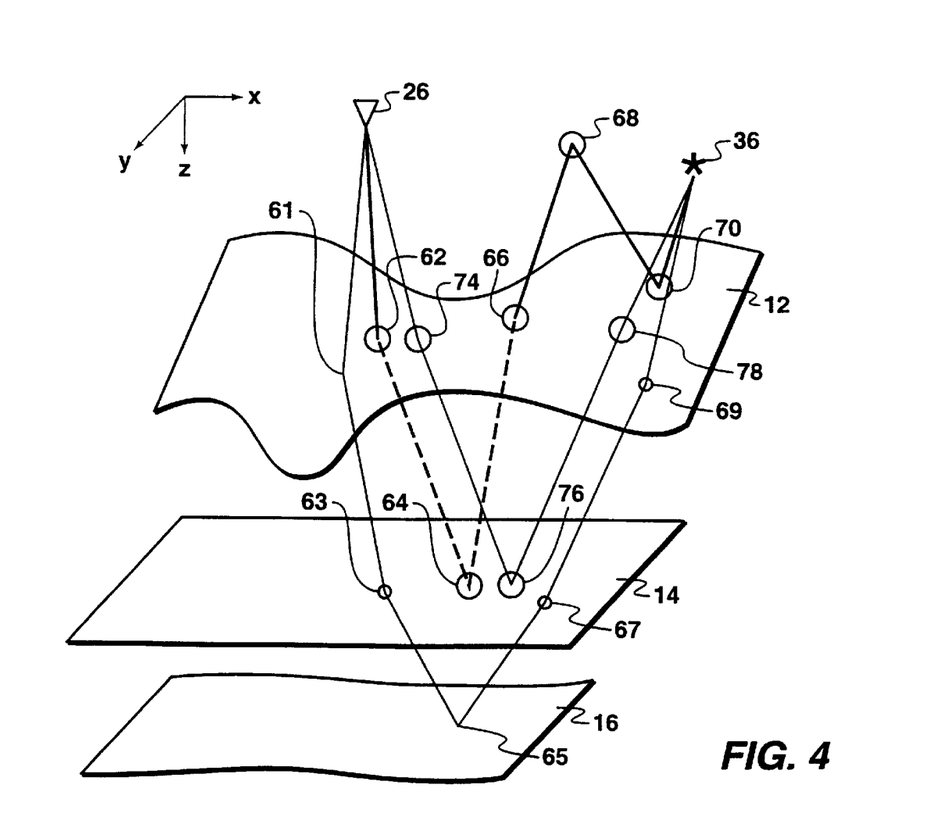
FIG. 4 depicts a simplified example of three raypaths contributing to a composite signal which may be recorded by an analyst attempting to image a second sub-seafloor reflector.

FIG. 4 is a picture of the geometry from a 3-D survey, including a raypath of a first order source pegleg that refracts, according to Snell's law, at seafloor 12 at locations 62 and 66 and reflects at location 64 from planar reflector 14 which is located at depth $Z_R$. For reference, a second planar reflector 16 is shown as being located below reflector 14. The velocity in the water layer, $V_w$, is again assumed constant, and a one dimensional interval velocity profile is assumed for the region bounded by the seafloor and reflector 14. This interval velocity profile may be assumed to be suspended vertically from the seafloor surface, thus giving velocity contour lines that parallel the seafloor, or the profile may be assumed to vary vertically with depth independent of the seafloor. Other assumptions may also be made, without limiting the present method.

As will be apparent to those skilled in the art, the pegleg multiple shown in FIG. 4 will generally have a longer traveltime than will be associated with the raypath of principal interest on planar reflector 14, which is shown as location 76. However, the pegleg multiple may have a traveltime similar to the raypath which reflects from reflector 16 at location 65, and, because reflector 16 may also be of interest to the analyst, the pegleg multiple will therefore preferably be attenuated from the seismic trace before further analysis.

For the reflection from reflector 14 at depth $Z_R$, a constant velocity equaling the average velocity between the water bottom and depth $Z_R$, called $V_{ave}(Z_R)$ is computed. As drawn in FIG. 4, the raypaths beneath the seafloor, which reflect from planar reflector 14, are straight. However, as will be understood to those skilled in the art, since $V_{ave}(Z_R)$ is a function of $Z_R$, the raypaths will in fact be curved. The straight raypath assumption is known as a Dix-type approximation, and is accurate for rays traveling in directions up to about 40 degrees away from the direction of the velocity gradient, which will generally be vertical.

The approximation of the sub-seafloor velocities with an average-velocity function may not be suitable in some geographic areas, such as where significant lateral velocity variations exist. This will be understood to those skilled in the art. However, the actual variability of the water-bottom is the principal contributor to the traveltime calculations for each predicted multiple. Thus, precision in the sediment velocity function is less important than is precision in the characterization $f(x,y)$ of seafloor 12.

From this discussion, the traveltime for the modeled raypath of the first order pegleg can be written as:

$$t_p = (R_{1p} + R_{4p} + R_{5p} + R_{6p})/V_w + (R_{2p} + R_{3p})/V_{ave}(Z_h)$$

The six raypath sublengths for this traveltime equation are as follows:

$$R_{1p} = \{(x_1 - x_r)^2 + (y_1 - y_r)^2 + f^2(x_1, y_1)\}^{1/2}$$

$$R_{2p} = \{(x_2 - x_1)^2 + (y_2 - y_1)^2 + f^2(x_1, y_1)\}^{1/2}$$

$$R_{3p} = \{(x_3 - x_2)^2 + (y_3 - y_2)^2 + f^2(x_3, y_3)\}^{1/2}$$

$$R_{4p} = \{(x_4 - x_3)^2 + (y_4 - y_3)^2 + f^2(x_3, y_3)\}^{1/2}$$

$$R_{5p} = \{(x_5 - x_4)^2 + (y_5 - y_4)^2 + f^2(x_5, y_5)\}^{1/2}$$

$$R_{6p} = \{(x_s - x_5)^2 + (y_s - y_5)^2 + f^2(x_5, y_5)\}^{1/2}$$

The (x,y) reference of locations 62, 64, 66, 68, and 70 occur at $(x_1,y_1)$, $(x_2,y_2)$, $(x_3,y_3)$, $(x_4,y_4)$ and $(x_5,y_5)$, respectively, with the depth coordinate z defined as a function of (x,y), as described above. As in the above, the form (x,y) has been used for simplicity in presentation of the equations, and not to necessarily indicate an identity of any of these locations with any of the locations corresponding to the equations presented above.

The equation for traveltime, $t_p$, has 10 unknowns, $x_1$, $y_1$, $x_2$, $y_2$, $x_3$, $y_3$, $x_4$, $y_4$, $x_5$, and $y_5$, in addition to $t_p$. As discussed above, the raypath must satisfy Fermat's principle, which results in the following equations:

$$\frac{\partial t_p}{\partial x_1} = \frac{\partial R_{1p}}{\partial x_1}\frac{1}{V_w} + \frac{\partial R_{2p}}{\partial x_1}\frac{1}{V_{ave}} = 0$$

$$\frac{\partial t_p}{\partial y_1} = \frac{\partial R_{1p}}{\partial y_1}\frac{1}{V_w} + \frac{\partial R_{2p}}{\partial y_1}\frac{1}{V_{ave}} = 0$$

$$\frac{\partial t_p}{\partial x_2} = \frac{\partial R_{2p}}{\partial x_2}\frac{1}{V_w} + \frac{\partial R_{3p}}{\partial x_2}\frac{1}{V_{ave}} = 0$$

$$\frac{\partial t_p}{\partial y_2} = \frac{\partial R_{2p}}{\partial y_2}\frac{1}{V_w} + \frac{\partial R_{3p}}{\partial y_2}\frac{1}{V_{ave}} = 0$$

$$\frac{\partial t_p}{\partial x_3} = \frac{\partial R_{3p}}{\partial x_3}\frac{1}{V_w} + \frac{\partial R_{4p}}{\partial x_3}\frac{1}{V_{ave}} = 0$$

$$\frac{\partial t_p}{\partial y_3} = \frac{\partial R_{3p}}{\partial y_3}\frac{1}{V_w} + \frac{\partial R_{4p}}{\partial y_3}\frac{1}{V_{ave}} = 0$$

$$\frac{\partial t_p}{\partial x_4} = \frac{\partial R_{4p}}{\partial x_4}\frac{1}{V_w} + \frac{\partial R_{5p}}{\partial x_4}\frac{1}{V_{ave}} = 0$$

$$\frac{\partial t_p}{\partial y_4} = \frac{\partial R_{4p}}{\partial y_4}\frac{1}{V_w} + \frac{\partial R_{5p}}{\partial y_4}\frac{1}{V_{ave}} = 0$$

$$\frac{\partial t_p}{\partial x_5} = \frac{\partial R_{5p}}{\partial x_5}\frac{1}{V_w} + \frac{\partial R_{6p}}{\partial x_5}\frac{1}{V_{ave}} = 0$$

$$\frac{\partial t_p}{\partial y_5} = \frac{\partial R_{5p}}{\partial y_5}\frac{1}{V_w} + \frac{\partial R_{6p}}{\partial y_5}\frac{1}{V_{ave}} = 0$$

This set of 10 nonlinear equations in 10 unknowns may be solved numerically to determine the Fermat's principle reflection raypath. The structure of this system of equations is the same as given above in the case of water-bottom multiples, and therefore the conjugate gradient method can again be used.

As discussed above, once the traveltime of the pegleg multiple has been determined, the removal of the pegleg multiple from the composite signal will occur via a least squares minimization procedure. In the procedure, the waveform which is determined for the first order water layer multiple will be used to estimate the first order pegleg multiple waveform. Thereafter, the higher order pegleg multiples are determined from lower order pegleg multiples, in a manner similar to that used for higher order water-bottom multiples.

As indicated in FIG. 2, both source and receiver pegleg multiples may be present in the composite trace. Therefore, the above described procedure may be repeated individually for both the source and the receiver pegleg multiples, so as to ensure maximum possible attenuation of multiples from the composite trace.

Because of the repetitive structure of the solution for each higher order set of equations, the method can be efficiently coded for computer-based solution. In addition, since this is a single trace procedure, it also has the advantages of being efficient and fully applicable to both 3-D and 2-D data sets.

The present method represents a cost-effective improvement over prior art multiple attenuation methods. The use of analytic ray tracing allows for efficiency and accuracy. It is applicable to seismic marine 2-D or 3-D data, subject only to the requirement that a bathymetry map be available. In addition, the method can also be applied to the multiples associated with other irregular subsurface reflectors. For example, the top of a salt feature, often a reflector with strong reflection coefficient, can generate multiples. The method can be applied to this situation as well, with the water bottom profile replaced by the top of salt profile and the water velocity replaced with the average velocity of the sediment above the top of the salt. Various modifications and alternatives will be apparent to those skilled in the art without departing from the true scope of the invention.

What is claimed is:

1. A method for attenuating a multiple reflection in a seismic data trace, said method comprising the steps of:
    (a) determining traveltimes for both said multiple reflection and a lower order reflection having a known waveform using analytic ray tracing according to Fermat's principle and Snell's law;
    (b) estimating a waveform for said multiple reflection using said known waveform for said lower order reflection to obtain an estimated waveform; and
    (c) subtracting said estimated waveform from said seismic data trace at said multiple reflection traveltime.

2. The method of claim 1 wherein said seismic data trace is a recording of the seismic energy received by a seismic receiver in response to a seismic signal from a seismic source, said multiple reflection is a water-layer-related multiple, said lower order reflection is a water-bottom reflection, and the step of estimating the waveform of said water-layer-related multiple reflection further comprises the steps of:
    (a) reversing the polarity of said water-bottom reflection for each time said water-layer-related multiple reflection reflects from the air-water interface; and
    (b) modifying the waveform of said water-bottom reflection to approximately match the waveform of said water-layer-related multiple reflection to obtain the estimated waveform.

3. The method of claim 2, wherein said step of modifying the waveform of said time shifted water-bottom reflection comprises the steps of:
    (a) shifting said water-bottom reflection to said seismic signal traveltime of said water-layer-related multiple reflection to obtain a time shifted water-bottom reflection;
    (b) identifying a time window containing said time shifted water-bottom reflection; and
    (c) minimizing the energy difference between said time shifted water-bottom reflection and the portion of said seismic data trace falling within said time window by adjusting the amplitude and/or providing a secondary timeshift of the time shifted water-bottom reflection.

4. The method of claim 1 wherein said seismic data trace is a recording of the seismic energy received by a seismic receiver in response to a seismic signal from a seismic source, said multiple reflection is a water-layer-related multiple, said lower order reflection is a lower order multiple reflection, and the step of estimating the waveform of said water-layer-related multiple reflection further comprises the steps of:
    (a) reversing the polarity of said time shifted lower order multiple reflection for each additional time said water-layer-related multiple reflection reflects from the air-water interface when compared to the lower order multiple; and
    (b) modifying the waveform of said time shifted lower order multiple reflection to approximately match the waveform of said water-layer-related multiple reflection.

5. The method of claim 4, wherein said step of modifying the waveform of said time shifted lower order multiple reflection comprises the steps of:
    (a) shifting said lower order multiple reflection to said seismic signal traveltime of said water-layer-related multiple reflection to obtain a time shifted lower order multiple reflection;
    (b) identifying a time window containing said time shifted lower order multiple reflection; and
    (c) minimizing the energy difference between said time shifted lower order multiple reflection and the portion of said seismic data trace falling within said time window by adjusting the amplitude and/or providing a secondary timeshift of the time shifted lower order multiple reflection.

6. The method of any of the preceding claims wherein the seismic data is derived from a three dimensional survey.

* * * * *